United States Patent
Sedklang et al.

(10) Patent No.: US 10,720,179 B1
(45) Date of Patent: Jul. 21, 2020

(54) HARD DISK DRIVE HEAD ASSEMBLY WITH TILT-PREVENTING STANDOFF FORMED ON FLEXURE COVER BENEATH SLIDER

(71) Applicant: Western Digital Technologies, Inc., San Jose, CA (US)

(72) Inventors: Wanchai Sedklang, Pathum Thani (TH); Pongsatorn Chawalitsittikul, Pathum Thani (TH); Anucha Suvibua, Pathum Thani (TH)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/374,332

(22) Filed: Apr. 3, 2019

(51) Int. Cl.
*G11B 5/48* (2006.01)
*G11B 5/60* (2006.01)
*G11B 21/21* (2006.01)

(52) U.S. Cl.
CPC .......... *G11B 5/486* (2013.01); *G11B 5/48* (2013.01); *G11B 5/4826* (2013.01); *G11B 5/4853* (2013.01); *G11B 5/60* (2013.01); *G11B 5/6082* (2013.01); *G11B 21/21* (2013.01)

(58) Field of Classification Search
None
See application file for complete search history.

(56) References Cited

U.S. PATENT DOCUMENTS

| | | | |
|---|---|---|---|
| 5,880,908 A * | 3/1999 | Shiraishi | G11B 5/4826 360/234.6 |
| 6,055,133 A | 4/2000 | Albrecht et al. | |
| 7,002,780 B2 * | 2/2006 | Rancour | G11B 5/4826 360/234.6 |

(Continued)

FOREIGN PATENT DOCUMENTS

| | | |
|---|---|---|
| CN | 2563685 Y | 7/2003 |
| JP | 10027447 A * | 1/1998 |

(Continued)

OTHER PUBLICATIONS

English-machine translation of JP 2013-020669A to Miura et al, published on Jan. 31, 2013. (Year: 2013).*

(Continued)

*Primary Examiner* — William J Klimowicz
(74) *Attorney, Agent, or Firm* — Loza & Loza, LLP; Gabriel Fitch

(57) ABSTRACT

Exemplary methods and apparatus are disclosed for a head assembly of a hard disk drive. In one example, a tilt-preventing standoff or datum is formed on a flexure cover layer of a head assembly of the hard disk drive to prevent tilting of a slider of the head assembly relative to the flexure cover layer during fabrication. The flexure cover layer may be, e.g., a laminate cover layer that covers and protects the flexure of the head assembly. In some examples, a primary standoff (or adhesive limitation) is formed on the flexure layer and shaped to limit the spread of an adhesive. The tilt-preventing standoff is a secondary standoff or datum that (Continued)

is sized and positioned to prevent tilting of the slider relative to the flexure cover layer during mounting of the slider to the flexure cover layer. The primary and secondary standoffs may be formed, for example, of polyamide.

17 Claims, 11 Drawing Sheets

(56) References Cited

U.S. PATENT DOCUMENTS

| | | | |
|---|---|---|---|
| 7,006,330 B1 * | 2/2006 | Subrahmanyam ... | G11B 5/4826 360/234.5 |
| 7,006,331 B1 * | 2/2006 | Subrahmanyam ... | G11B 5/4826 360/234.6 |
| 7,307,816 B1 | 12/2007 | Thornton et al. | |
| 7,545,605 B2 * | 6/2009 | Hagiya | G11B 5/4826 360/234.5 |
| 7,562,435 B2 | 7/2009 | Mahadev et al. | |
| 7,570,458 B1 | 8/2009 | Coon | |
| 7,729,089 B1 * | 6/2010 | Hogan | G11B 5/4826 360/234.6 |
| 7,777,991 B2 | 8/2010 | Feng et al. | |
| 7,859,793 B2 * | 12/2010 | Uematsu | G11B 5/4826 360/234.5 |
| 7,995,310 B1 * | 8/2011 | Pan | G11B 5/4826 360/234.6 |
| 8,027,128 B2 * | 9/2011 | Muraki | G11B 5/4826 360/245.3 |
| 8,159,790 B2 | 4/2012 | Tan et al. | |
| 9,558,768 B1 * | 1/2017 | Tsuchiya | G11B 5/4826 |
| 2002/0133933 A1 | 9/2002 | Erpelding et al. | |
| 2006/0087768 A1 * | 4/2006 | Erpelding | G11B 5/4853 360/234.5 |
| 2006/0285249 A1 * | 12/2006 | Hagiya | G11B 5/6005 360/234.5 |
| 2006/0285250 A1 * | 12/2006 | Hagiya | G11B 5/6005 360/234.5 |
| 2006/0285251 A1 * | 12/2006 | Hagiya | G11B 5/4826 360/234.5 |
| 2006/0285252 A1 | 12/2006 | Hagiya et al. | |

FOREIGN PATENT DOCUMENTS

| | | | |
|---|---|---|---|
| JP | 2007305270 A * | 11/2007 | ........ G11B 5/4826 |
| JP | 2013020669 A * | 1/2013 | |

OTHER PUBLICATIONS

Lau et al; "An electro-thermally activated rotary micro-positioner for slider-level dual-stage positioning in hard disk drives;" IOP Science, Feb. 9, 2016; Journal of Micromechanics and Microengineering; vol. 26, No. 3; https://iopscience.iop.org/article/10.1088/0960-1317/26/3/035016/meta; 3 pages.

Anzalone, Alessandro; "DATUMS (PLANAR);" Hillsborough Community College; Jun. 30, 2011; https://etshare.pbworks.com/f/Datums%20(Planar).pdf; 34 pages.

International Search Report and Written Opinion for International Application No. PCT/US2019/068426, dated Apr. 28, 2020, 8 pages.

\* cited by examiner

HARD DISK DRIVE HEAD ASSEMBLY WITH TILT-PREVENTING STANDOFF FORMED ON FLEXURE COVER BENEATH SLIDER

FIELD

Aspects of the disclosure relate generally to hard disk drives, and more specifically, to hard disk drive head assemblies having sliders mounted to a flexure.

INTRODUCTION

Hard disk drives retrieve and/or store data in computers and other consumer electronics devices. A hard disk drive includes one or more heads that can read and write information on a corresponding surface of a spinning disk using magnets, lasers, or other suitable devices. (The heads may perform other functions as well, such as micro-actuation, flying height control, touch down detection, lapping control, localized disk media heating, etc.) Each head is a sub-component of a head assembly, which in some examples may be a head gimbal assembly (HGA). The head assembly may include a suspension assembly for holding the head and providing a plurality of electrical connections thereto. The suspension assembly may include a fragile laminated flexure to carry the electrical signals to and from the head.

The head assembly often includes a slider (sometimes called a head slider) that provides an air bearing surface (ABS) that faces the magnetic disk surface, a trailing face, and a mounting face (that is opposite the ABS and faces away from the ABS). The head may be mounted to the slider. For example, a magnetic sensor or other sensor and a plurality of head bond pads may be disposed on the trailing face of the slider. The mounting face of the slider may be permanently bonded to a tongue portion of the fragile laminated flexure by an adhesive, in a position such that the plurality of head bond pads are aligned with corresponding bond pads on the laminated flexure.

During assembly, a pickup head, gripper or other suitable device may be used to press the slider down onto an adhesive that is positioned over a flexure cover layer (e.g. the laminate that covers the flexure) to mount the slider at a desired distance (spacing or gap) from the flexure cover layer. In some instances, the slider may tilt relative to the flexure cover layer during assembly (so that the slider is not properly level), resulting in a defective component that is discarded.

It would be desirable to provide improved methods and apparatus for better maintaining a level slider during assembly.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of this disclosure provides a head assembly for a hard disk drive that includes: a slider; a flexure layer; an adhesive on the flexure layer to affix the slider to a first portion of the flexure layer; a first standoff formed on the flexure layer and shaped to limit spread of the adhesive beyond the first portion of the flexure layer; and a second standoff formed on a second portion of the flexure layer that is separate from the first portion and separate from the adhesive, wherein the first and second standoffs both extend a same height above the flexure layer toward the slider, and wherein the second standoff is positioned to prevent tilting of the slider relative to the flexure layer during mounting of the slider onto the flexure layer.

Another embodiment of the disclosure provides a data storage device that includes: a head assembly that includes a slider, a flexure layer, an adhesive on the flexure layer to affix the slider to a first portion of the flexure layer, a first standoff formed on the flexure layer and shaped to limit spread of the adhesive beyond the first portion of the flexure layer, and a second standoff formed on a second portion of the flexure layer that is separate from the first portion and separate from the adhesive, wherein the first and second standoffs both extend a same height above the flexure layer toward the slider, and wherein the second standoff is positioned to prevent tilting of the slider relative to the flexure layer during mounting of the slider onto the flexure layer.

Yet another embodiment of the disclosure includes a method for providing a head assembly for a hard disk drive. The method includes: providing a first standoff on a flexure layer, wherein the first standoff is shaped to limit spread of an adhesive beyond a first portion of the flexure layer; providing a second standoff on a second portion of the flexure layer that is separate from the first portion and separate from the adhesive, wherein the first and second standoffs both extend a same height above the flexure layer toward a slider, wherein the second standoff is positioned to prevent tilting of the slider relative to the flexure layer during mounting of the slider onto the flexure layer; applying an adhesive within the first portion of the flexure layer; and pressing the slider onto the first and second standoffs and the adhesive so that the slider is supported by the first and second standoffs and affixed to the flexure layer by the adhesive.

DETAILED DESCRIPTION

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Aspects described herein are directed to providing standoffs formed on a flexure cover layer of a head assembly of a hard disk drive, where the standoffs are configured, for example, to prevent tilting of a slider of the head assembly relative to the flexure cover layer during mounting of the slider onto the flexure cover layer. The flexure cover layer may be, for example, a laminate cover layer that covers and protects the flexure of the head assembly. In some examples, a primary (or first) standoff is formed on the flexure layer and shaped to limit the spread of an adhesive beyond a first portion or area of the flexure cover layer. The primary standoff may be referred to herein as an adhesive limitation or adhesive limiting structure. A secondary (or second) standoff is formed on a second portion or area of the flexure cover layer that is separate from the first portion and separate from the adhesive. The second standoff is sized and positioned to prevent tilting of the slider relative to the flexure cover layer during mounting of the slider onto the flexure cover layer. The second standoff may be referred to herein as a tilt-preventing standoff or tilt-preventing datum. The primary and secondary standoffs may both extend the same (predetermined) height above the flexure cover layer to support the slider so that, following mounting, a lower flat surface of the slider remains parallel with an upper flat surface of the flexure cover layer. In some illustrative examples, the secondary tilt-preventing standoff or datum is a polyamide dot positioned about 70% of the distance from a proximal (first) end of the slider to a distal (second) end of the slider so as to prevent tilting of the slider during mounting without the polyamide dot being too close to a distal end of the flexure cover layer.

Overview of Exemplary Disk Drive with a Head Assembly

Figure 1:
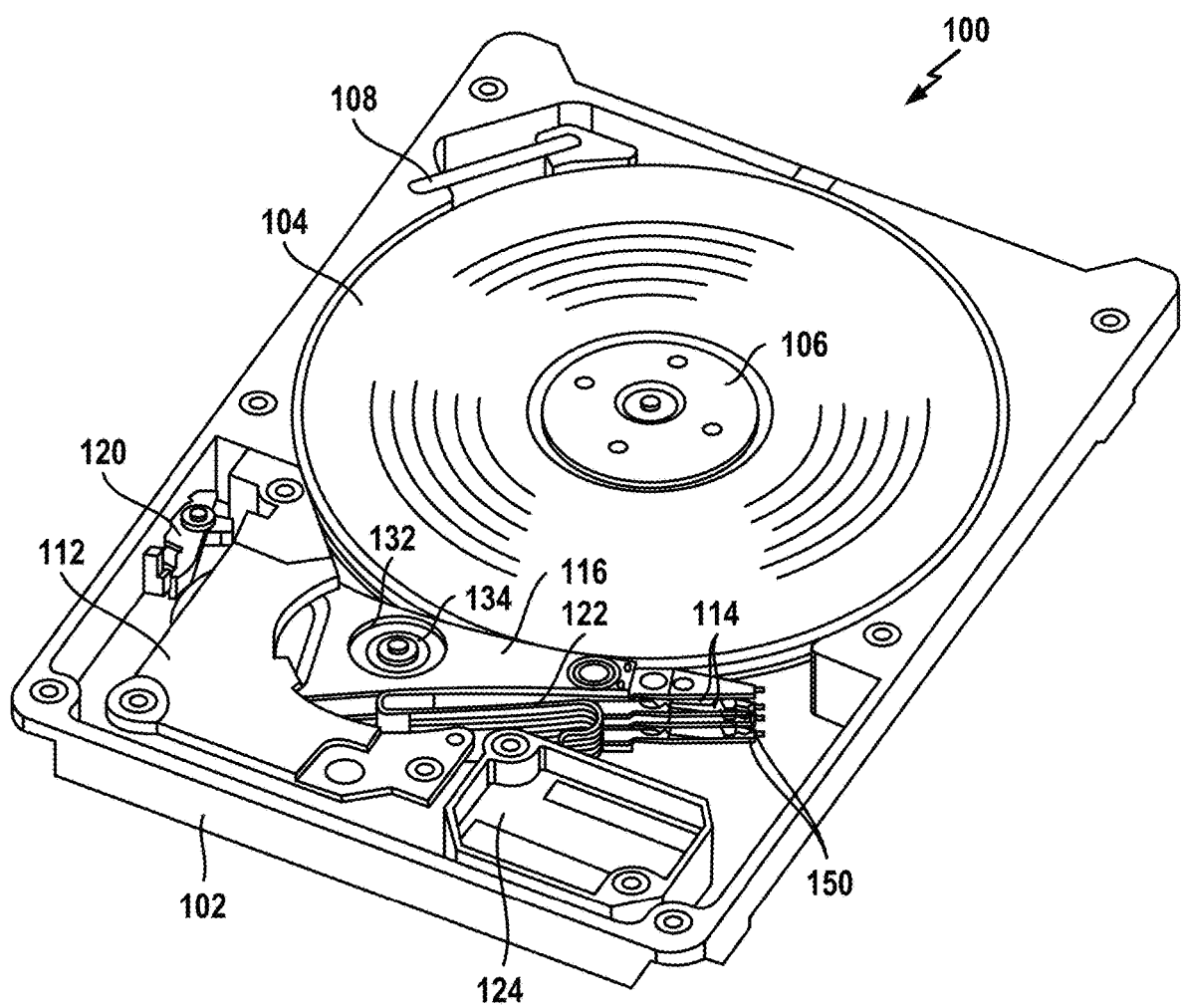
FIG. 1 is a top perspective view of a disk drive information storage device that is capable of including an embodiment of the present disclosure, with the top cover removed to reveal internal components.

FIG. 1 is a top perspective view of a data storage device such as a disk drive 100 capable of including embodiments described in more detail herein-below, with the top cover removed to reveal internal components. The disk drive 100 includes a disk drive base 102 and two annular disks 104 for illustration, though any number of disks can be used. The disk drive 100 further includes a spindle 106, rotatably mounted on the disk drive base 102, for rotating the disks 104. The rotation of the disks 104 establishes air flow through recirculation filter 108. In other embodiments, disk drive 100 may have only a single disk, or alternatively, more than two disks. The disk drive 100 further includes an actuator 116 that is pivotably mounted on disk drive base 102, for example by a pivot bearing 134 fit into a bore 132 in the body of the actuator 116. A voice coil motor 112 may pivot the actuator 116 through a limited angular range so that at least one head assembly or head gimbal assembly (HGA) 114 is desirably positioned relative to one or more tracks of information on a corresponding one of the disks 104. In the embodiment of FIG. 1, the actuator 116 includes three arms upon which four HGAs 114 are attached, each corresponding to a surface of one of the two disks 104. However in other embodiments fewer or more HGAs 114 may be included depending on the number of disks 104 that are included and whether the disk drive 100 is depopulated. Each HGA 114 may include a head 150 for reading and writing from/to one of the disks 104. The head 150 may perform various functions and contain various microscopic structures such as a read transducer for reading data, a write transducer for writing data, a microactuator, a heater, an energy assist recording component such as a laser or spin torque oscillator, a lapping guide, etc. The actuator 116 may occasionally be latched at an extreme angular position within the limited angular range by the latch 120. Electrical signals to/from the HGAs 114 are carried to other drive electronics via a flexible printed circuit (FPC) that includes a flex cable 122 (preferably including a preamplifier circuit) and flex cable bracket 124.

Figure 2:
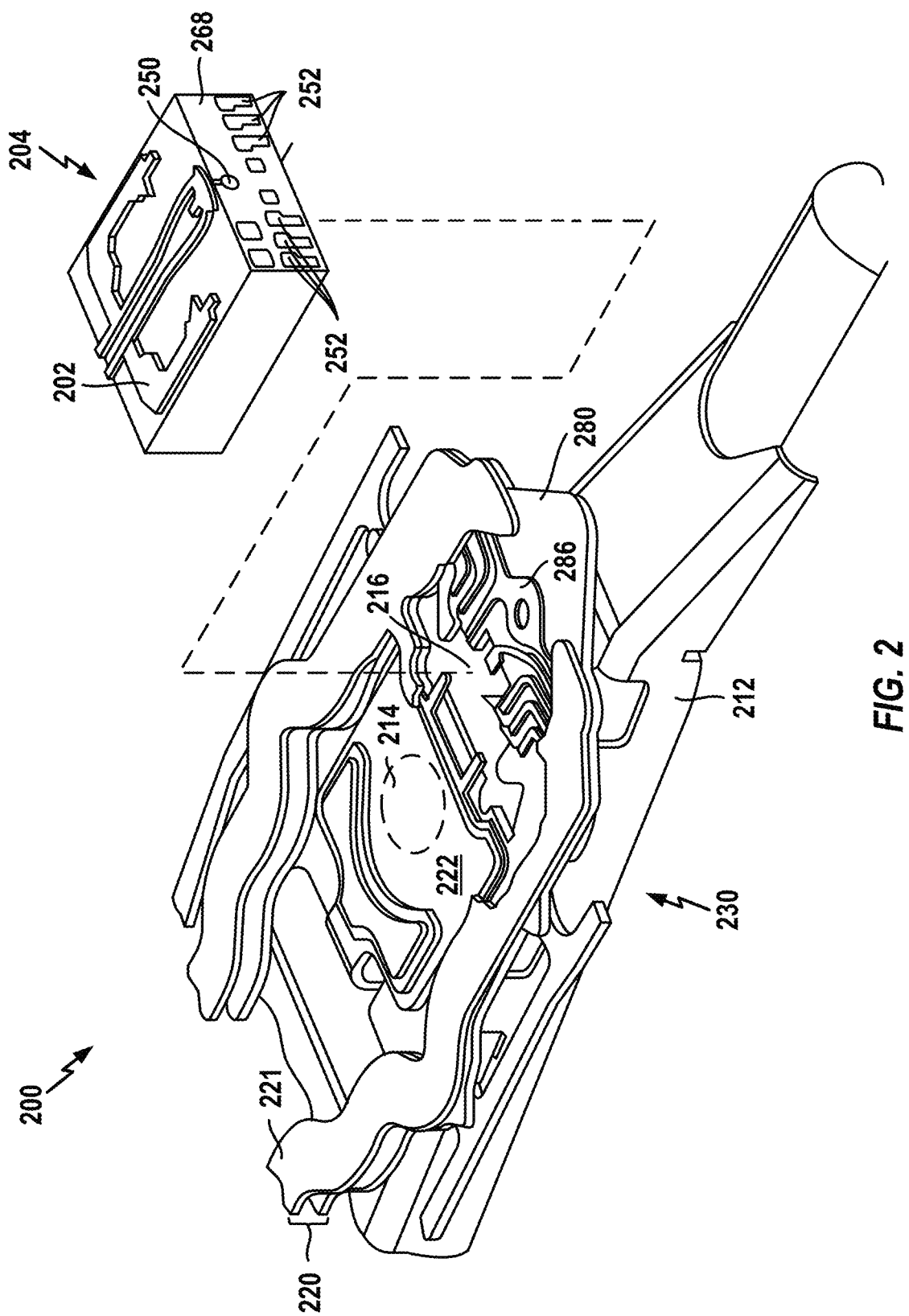
FIG. 2 is a top perspective view of an end of a head assembly capable of including an embodiment of the present disclosure.

FIG. 2 is a perspective view of the distal portion of an exemplary HGA 200 capable of including embodiments described in detail below (although it is noted that the secondary tilt-preventing standoff mentioned above is not specifically shown in the figure). In FIG. 2, a head 204 is shown exploded away from a suspension assembly 230 of the HGA 200. A slider air bearing surface (ABS) 202 may be formed by etching or ion milling into a slider substrate of the head 204, according to dimensions that may be defined by use of a mask. The slider substrate of the head 204 includes a trailing face 268 that is approximately orthogonal to the ABS 202 (e.g. within ±10° of perfect orthogonality). The head 204 includes a read/write transducer 250 deposited on the trailing face 268. The head 204 may be disposed on the suspension assembly 230. For example, the head 204 may sit on top of area 216 with, e.g., head 204 sitting on the ledge supported by the tongue 222 and the traces 286, with the traces 286 connecting to the pads 252. The positioning of the head 204 atop area 216 is shown by the dashed line in FIG. 2.

In the exemplary embodiment of FIG. 2, the suspension assembly 230 may comprise a load beam 212 and a laminated flexure 220. A purpose of the load beam 212 is to provide vertical compliance for the head 204 to follow vertical undulations of the surface of a disk (e.g. disk 104 of FIG. 1) as it rotates, and to preload the slider ABS 202 of the head 204 against the disk surface by a preload force (that is commonly referred to as the "gram load") during disk drive operation. The laminated flexure 220 may include a tongue 222 on which the read head 204 may be mounted. The tongue 222 may be in contact with the load beam 212, for example via a conventional dimple 214 that transfers the gram load from the load beam 212 to the head 204 to preload the slider ABS 202 against the surface of a rotating disk.

One purpose of the laminated flexure 220 may be to provide compliance for the head 204 to follow pitch and roll angular undulations of the surface of the disk (e.g. disk 104) as it rotates, while restricting relative motion between the head 204 and the load beam 212 in the lateral direction and about a yaw axis. Another purpose of the laminated flexure 220 may be to provide a plurality of electrical paths to facilitate signal transmission to/from the head 204. A top layer 221 of the laminated flexure 220 may be referred to as a flexure cover layer or flexure covering layer. For that later purpose, the laminated flexure 220 may include a plurality of electrically conductive traces 224 that are defined in an electrically conductive layer 286, and that are electrically isolated from a supporting structural layer 280. The electrically conductive traces 224 may comprise copper, for example, and the supporting structural layer 280 may comprise stainless steel. In the embodiment of FIG. 2, the read/write transducer 250 may be electrically accessed through a subset of the head bond pads 252 on the slider trailing face 268. Each of the head bond pads 252 is preferably electrically connected to a respective one of the conductive traces 224, for example by gold ball bonding or another applicable conventional method.

Figure 3:
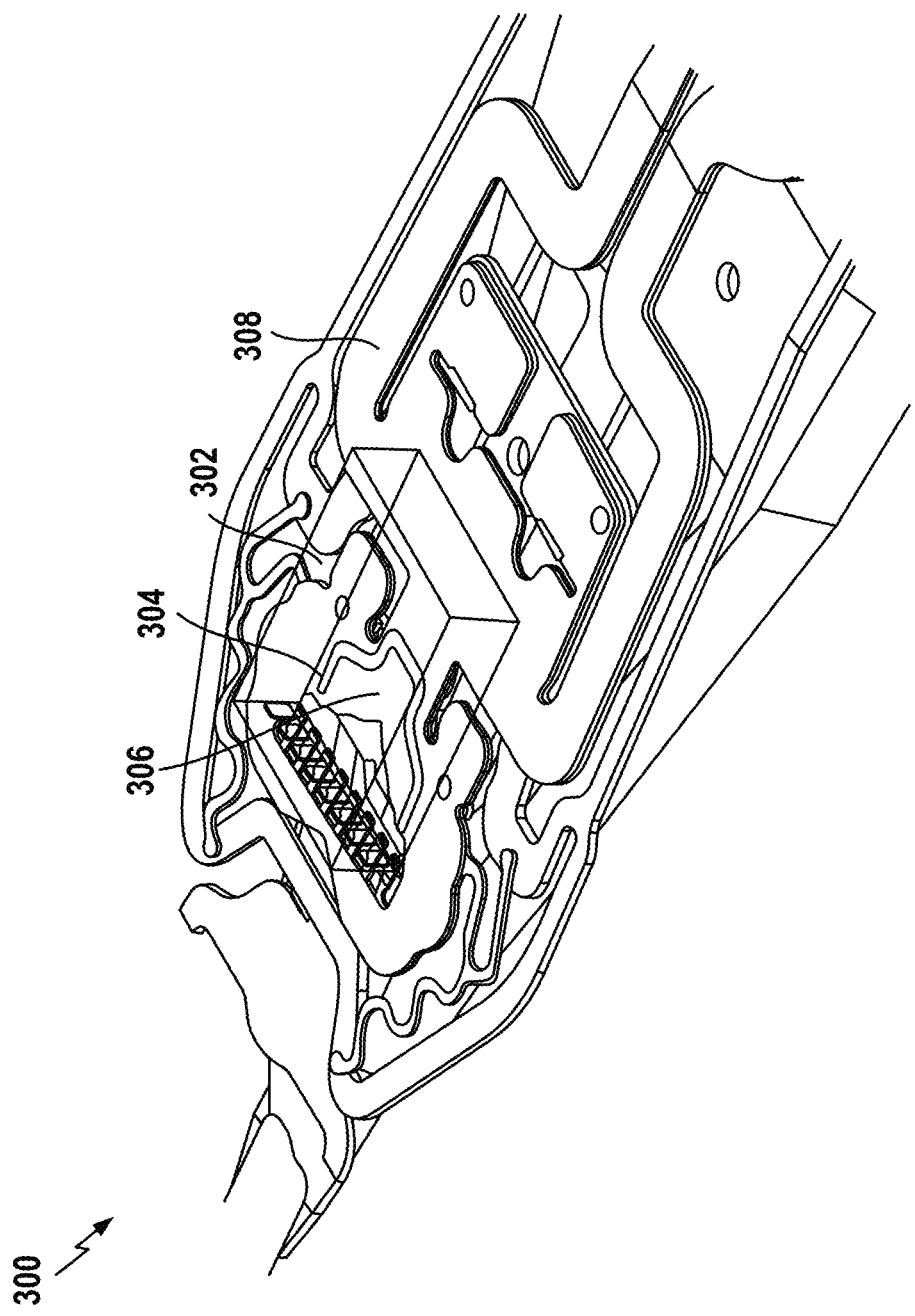
FIG. 3 is a top perspective view illustrating portions of a head assembly that lacks a tilt-preventing standoff or tilt-preventing datum.

Illustrative Head Assembly Embodiments without a Tilt-Limiting Standoff or Datum FIG. 3 is another top perspective view of a portion of an exemplary head assembly 300, which has a somewhat different design as the head assembly of FIGS. 1 and 2. In FIG. 3, a slider 302 is shown as a transparent block to permit a view of an adhesive limitation or standoff 304, which limits spreading of adhesive (not shown) out of an area 306 bounded by the standoff 304 as the slider 302 is mounted to a flexure cover layer 308. No secondary standoff of the type mentioned above is provided in the head assembly 300 and hence, as will be explained with reference to the next figure, tilting of the slider 302 can occur during mounting of the slider 302 to the flexure cover layer. (In FIG. 3, the actual read head is not shown.)

Figure 4:
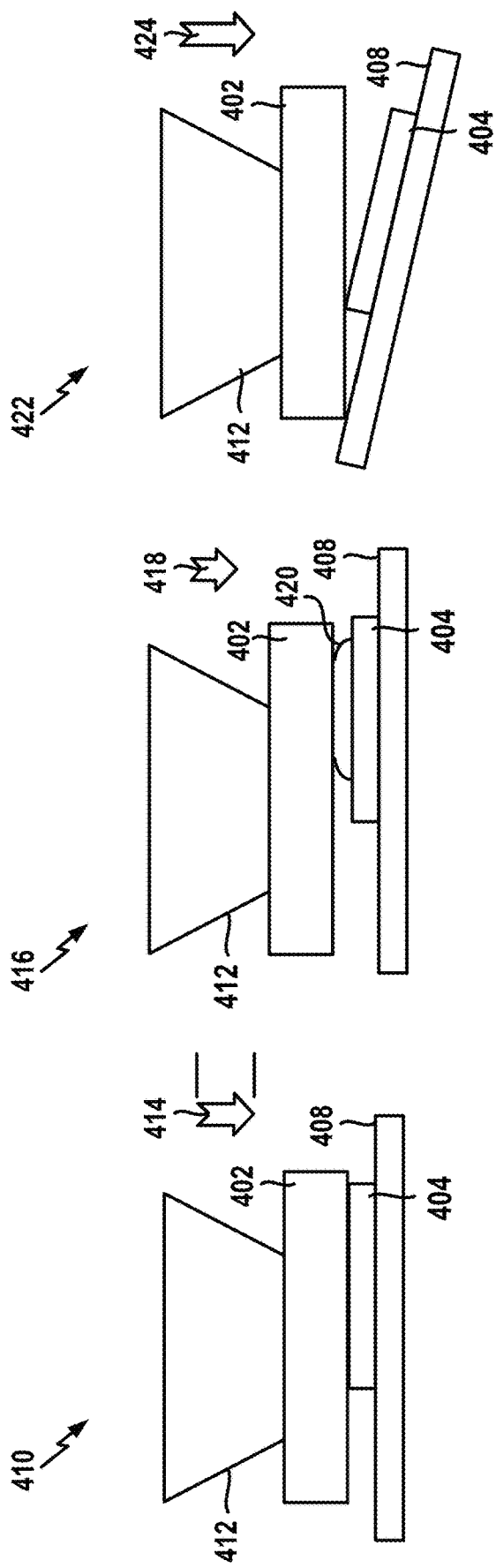
FIG. 4 schematically illustrates the mounting of a slider to a flexure cover layer for a head assembly that lacks a tilt-preventing standoff or tilt-preventing datum.

FIG. 4 schematically illustrates problems that can arise when mounting a slider 402 to a flexure cover layer 408 if an adhesive limitation or standoff 404 is formed at one end of the flexure cover layer 408 and too little or too much force is used during mounting of the slider 402. As shown in a first illustration 410, a pickup head or gripper 412 may be used to grip the slider 402 and press the slider 402 down onto the adhesive limitation or standoff 404 in which a quantity of adhesive (not visible within illustration 410) is positioned. If precisely the correct amount of downward force (as indicated by arrow 414) is used, the slider will be mounted properly with its lower (bottom) surface parallel to the upper (top) surface of the adhesive limitation or standoff 404 and with all of the adhesive contained within an area bounded by the adhesive limitation or standoff 404. However, in practice, precise mounting can be difficult to achieve with this design.

If, as shown in illustration 416, too little force is used (as indicated by arrow 418), adhesive 420 will not be fully pressed down into the area surrounded by the adhesive limitation standoff 404 and the adhesive 420 will set improperly. As a result, even though the slider 402 may be properly parallel with the flexure cover layer 408, the spacing between the lower (bottom) surface of the slider 402 and the upper (top) surface of the flexure cover layer 408 will be too great (e.g. the spacing will not meet design specifications). In such a case, the head assembly may need to be discarded. Still further, if, as shown in illustration 422, too much force is used (as indicated by arrow 424), the flexure cover layer 408 will tilt relative to the slider 402 (or vice versa). As a result, the lower (bottom) surface of the slider 402 and the upper (top) surface of the flexure cover layer 408 will not be parallel. At one end, the spacing will be too great. At the other end, the spacing will be too small. Accordingly, the head assembly with slider and flexure may also need to be discarded (particularly if the adhesive, not specifically shown in illustration 422, has set or cures so that the angle of the slider 402 cannot be corrected). In some practical manufacturing scenarios, about 0.05% of head assemblies are rejected due to problems in the positioning of the slider (e.g. the gap or distance between the slider and the flexure cover layer is outside specifications following assembly).

Illustrative Head Assembly Embodiments with a Tilt-Limiting Standoff or Datum

Figure 5:
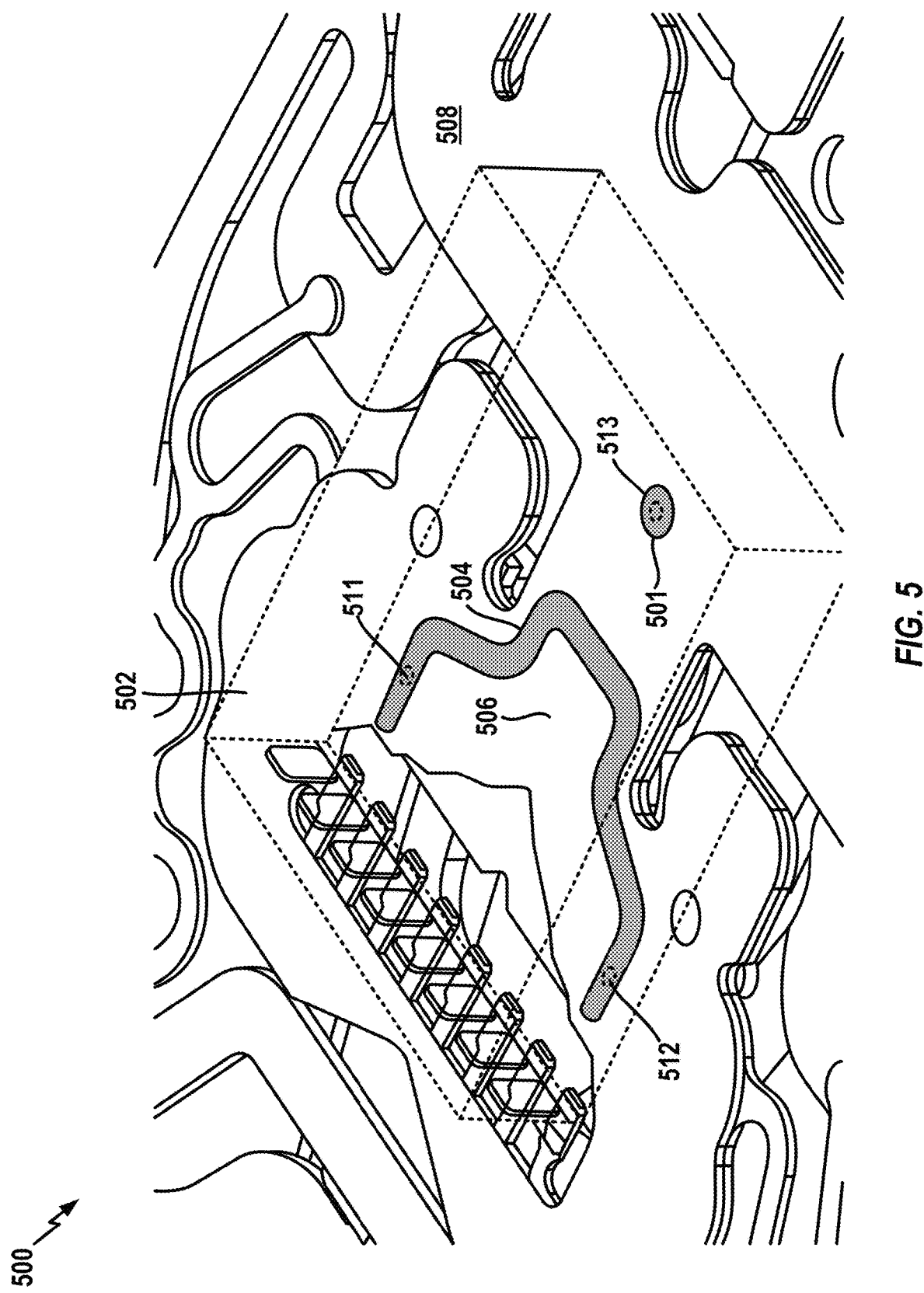
FIG. 5 is a top perspective view illustrating portions of a head assembly that includes a tilt-preventing standoff or datum.

FIG. 5 is a top perspective view of a portion of an exemplary head assembly 500, which differs from the design of FIGS. 3 and 4 by, at least, the addition of a tilt-limiting standoff or datum 501. In FIG. 5, a slider 502 is shown as a transparent block (in dashed lines) to permit a view of an adhesive limitation standoff 504, which limits spreading of adhesive (not shown in FIG. 5) out of an area 506 bounded by the standoff 504 as the slider 502 is mounted to a flexure cover layer 508. (Standoffs 501 and 504 are shaded in the drawing to improve their visibility.) In this example, the secondary tilt-limiting standoff 501 is a polyamide dot positioned on the flexure cover layer 508 about midway between a straight portion 510 of the adhesive limitation standoff 504 and an end of the slider 502. The (secondary) tilt-limiting standoff 501 and the (primary) adhesive limitation standoff 504 both extend, project or protrude the same or equal distance above the flexure cover layer 508 toward the slider 502 to provide at least three datum points (511, 512, and 513, as indicated) on which the slider 502 rests (once the slider has been mounted) so that a bottom surface of the slider 502 remains parallel to a top surface of the flexure cover layer 508 (once the adhesive, not shown in FIG. 5, dries or sets). Herein, a datum is a reference plane and a datum point is a reference point upon which components may be aligned to that pane or with which calculations or measurements may be taken. As can be appreciated, three datum points uniquely define a plane and so the three datum points 511, 512, and 513 define a plane on which the slider is mounted and aligned. The adhesive limitation standoff 504 is formed in the shape of a loop or portion thereof (or partial loop or half-loop). As shown, one portion is straight whereas other portions of the loop are curved. The loop need not be a complete loop and the term loop as used herein is meant to include portions of a complete loop. For example, in one aspect, the standoff 504 has a cross section in the shape of a loop enclosing portion or area 506 of the flexure layer on which the adhesive is positioned, each portion of the standoff 504 along the loop extending a same height above the flexure layer toward the slider.

Figure 6:
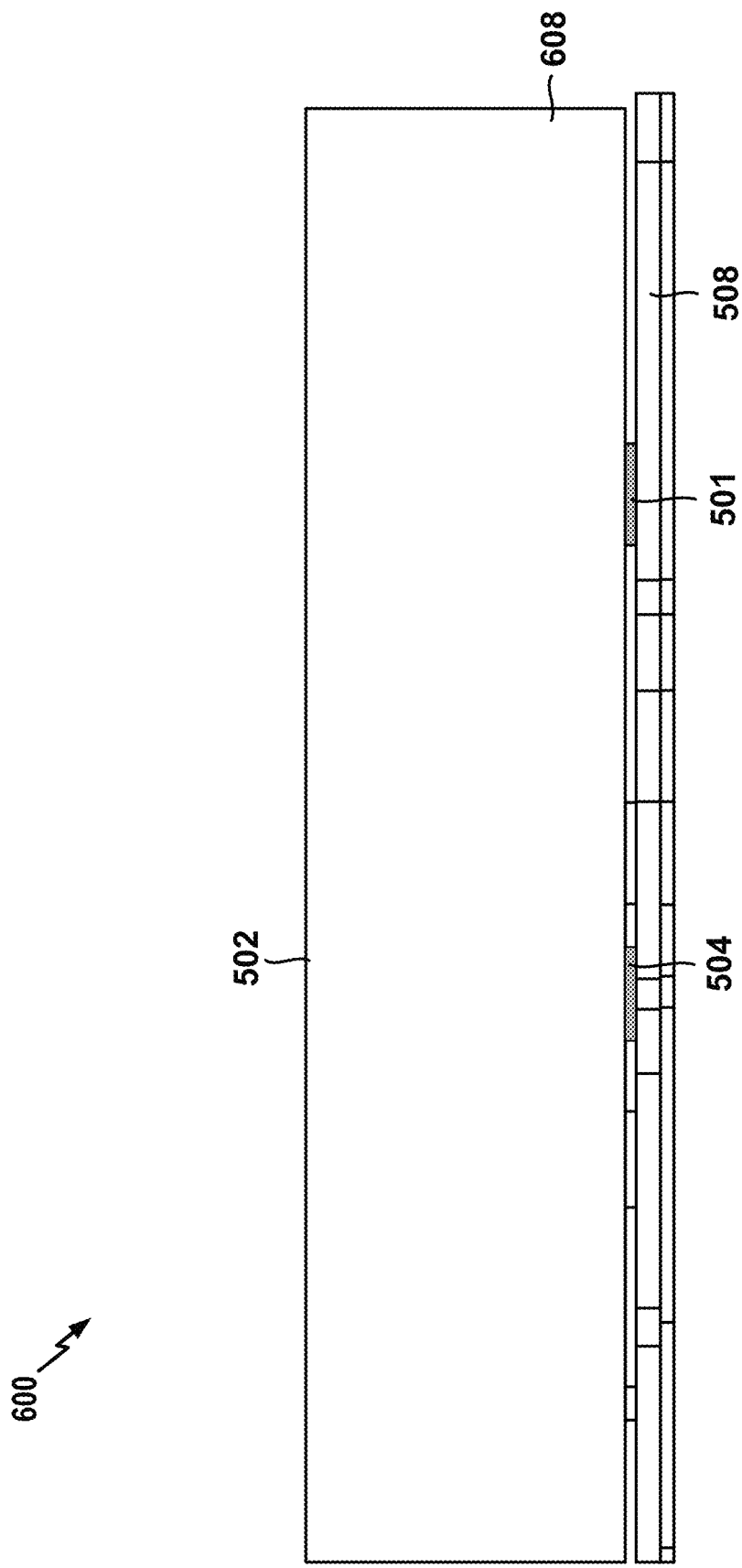
FIG. 6 is a side cross-sectional view illustrating portions of a head assembly that includes a tilt-preventing standoff or datum.

FIG. 6 provides a side cross-sectional view of a portion of the head assembly 500, particularly illustrating the tilt-limiting standoff 501, the slider 502, the adhesive limitation standoff 504, and the flexure cover layer 508. The tilt-limiting standoff 501 serves to prevent (or at least reduce the likelihood of) the slider 502 tilting relative to the flexure cover layer 508 during assembly. (Standoffs 501 and 504 are again shaded in the drawing to improve their visibility.)

Figure 7:
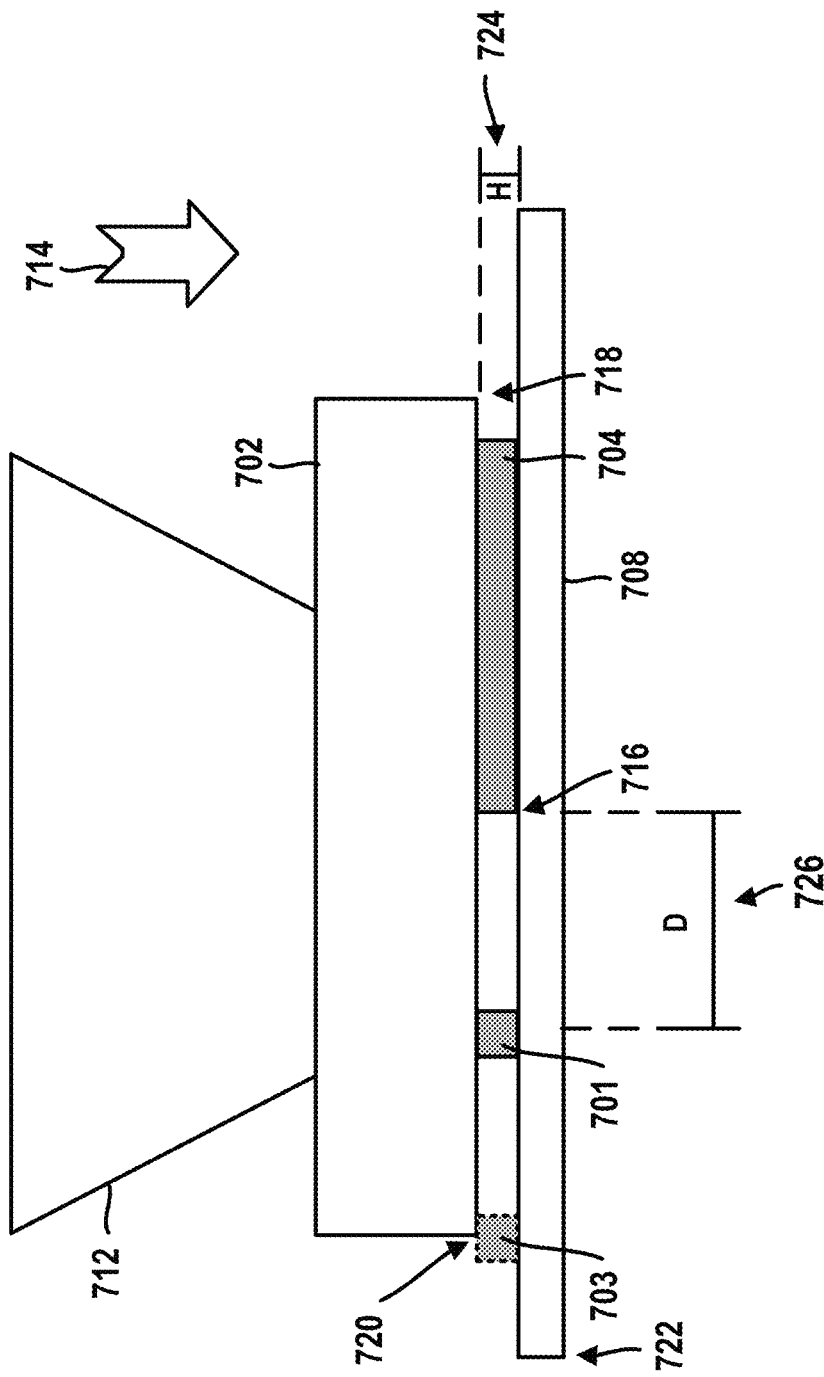
FIG. 7 schematically illustrates the mounting of a slider to a flexure cover layer for a head assembly that includes a tilt-preventing standoff or datum.

FIG. 7 schematically illustrates how a tilt-limiting standoff may prevent (or reduce the likelihood of) a slider tilting relative to a flexure cover layer during assembly. In FIG. 7, a tilt-limiting standoff 701 extends or protrudes from a flexure cover layer 708 by the same or equal amount that an adhesive limitation standoff 704 also extends or protrudes from the same flexure cover layer 708. (Standoffs 701 and 704 are shaded in the drawing to improve their visibility.) A gripper 712 pushes a slider 702 down with a suitable amount of force (indicated by arrow 714) onto the standoffs 701 and 704 to press adhesive (not shown in FIG. 7) down within an area surrounded by the adhesive limitation standoff 704. The tilt-limiting standoff 701 prevents the slider 702 from tilting (in the manner shown in illustration 422 of FIG. 4, discussed above). By preventing the slider 702 from tilting, at least some defective head assemblies can be avoided, thus improving overall manufacturing efficiency. Both the tilt-limiting standoff 701 and the adhesive limitation standoff 704 may be formed of polyamide (though other compounds or materials may instead be used). Any appropriate adhesive may be used. In one aspect, the standoffs may be provided by extruding polyamide onto the flexure while forming the extruded polyamide into a selected shape with a selected height. In other aspects, the standoffs may be pre-formed or prefabricated and then affixed to the flexure. Alternative fabrication or position techniques might be used as well. In an illustrative example, the tilt-preventing standoff may have a cylindrical shape with flat top and bottom surfaces.

As shown in FIG. 7, the adhesive limitation standoff 704 has an end 716. The slider has a first end 718 and a second end 720. The tilt-limiting standoff 701 is positioned about midway (e.g. 50% of the way) between the first end 716 of the adhesive limitation standoff 704 and the second end 720 of the slider 702. That is, a spacing D between a center of the tilt-limiting standoff 701 and the end 716 of the adhesive limitation standoff 704 is selected by an amount sufficient to place the tilt-limiting standoff 701 about midway between the end 716 of the adhesive limitation standoff 704 and the second end 718 of the slider 702. This position of the tilt-limiting standoff 701 is also about 70% of the way from the first end 718 of the slider 702 to the second end 720 of the slider 702. As such, the tilt-limiting standoff 701 is positioned in the example of FIG. 7 at a location more than 50% of a distance from the first end 718 of the slider to the second end 720 of the slider. In other examples, the tilt-limiting standoff 701 is positioned at a location which is a minimum of 60% of the distance from the first end 718 of the slider 702 to the second end 720 of the slider 702 such as, for example, in the range of 60%-90% of the distance. That is, the tilt-limiting standoff 701 is positioned closer to end 720 rather than end 718. In still other examples, the tilt-limiting standoff 701 may be positioned even closer to the first end 720 of the slider 702. See, e.g., alternate slider location 703 shown in dotted lines in FIG. 7 where the tilt-limiting standoff 701 is aligned with the end 720 of the slider. And so, in some examples, the tilt-limiting standoff 701 is positioned at a location in the range of 60%-100% of the distance from the first end 718 of the slider 702 to the second end 720 of the slider 702. Note that, depending upon the particular manufacturing/assembly systems being used, it might be disadvantageous for the tilt-limiting standoff 701 to be too close to an end 722 of the flexure cover layer 708, which may present difficulties in the placement of the tilt-limiting standoff 701. (Depending upon the orientation, end 720 may be regarded as the leading edge with end 718 as the trailing edge.)

FIG. 7 also illustrates a height H of the tilt-limiting standoff 701 and the adhesive limitation standoff 704, which is also the height H of the bottom surface of the slider 702 from the top surface of the flexure cover layer 708 (when the slider 702 is mounted). In some examples, the height H (also known as the slider gap) is no less than 0.005 mm and, in some examples, is in the range of (minimum) 0.005 mm and (maximum) 0.020 mm.

Additional Exemplary Apparatus Embodiments

Figure 8:
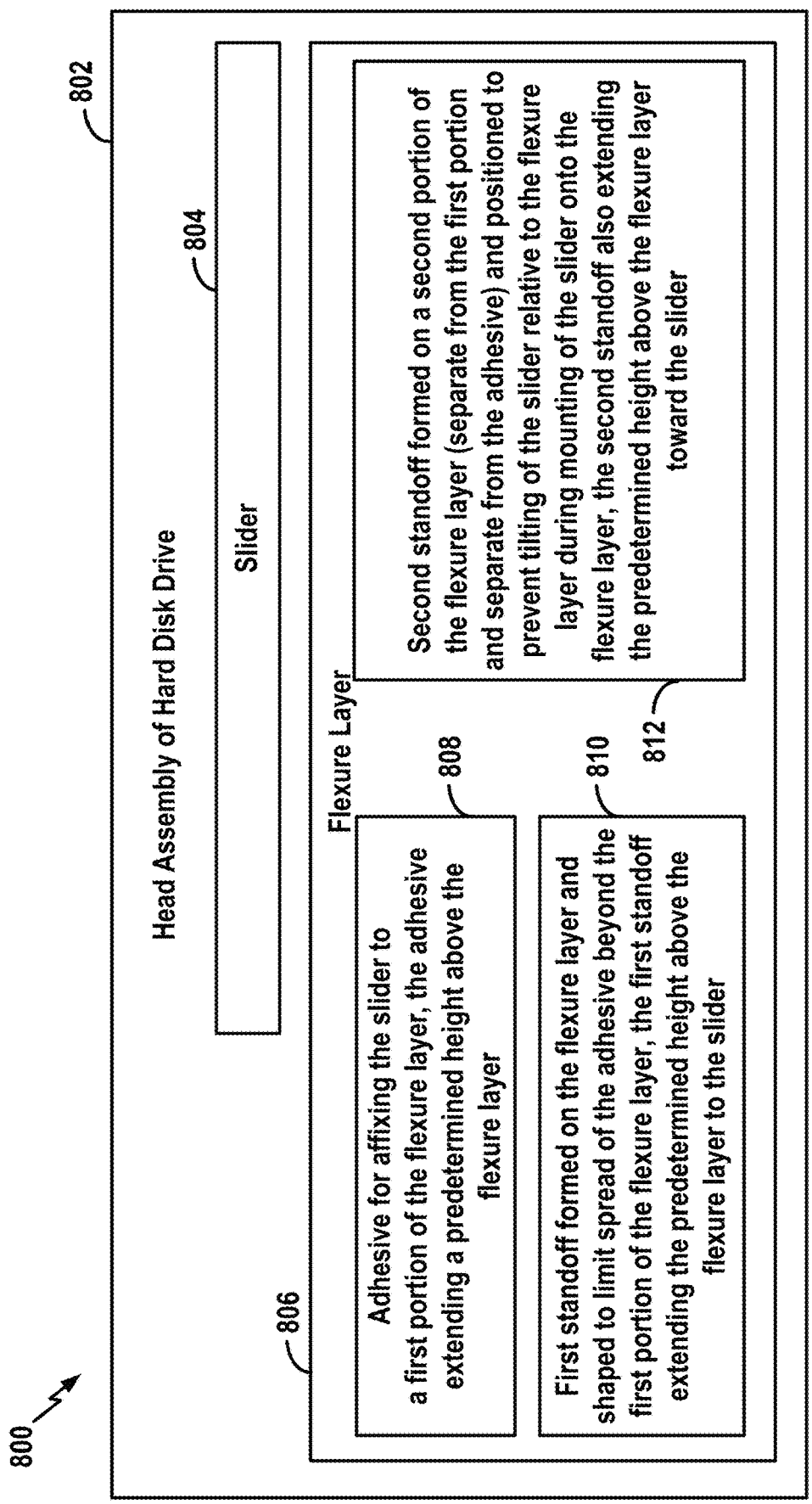
FIG. 8 is a block diagram of an exemplary head assembly of a hard disk drive.

FIG. 8 illustrates an exemplary apparatus 800 with components provided and configured according to an aspect of the disclosure. The apparatus 800 includes, as shown by block 802, head assembly of a hard disk drive. The head assembly 802 includes a slider 804 and a flexure layer 806 (e.g. a cover layer of a laminated flexure component). An adhesive 808 is provided for affixing the slider 804 to a first portion of the flexure layer 806, the adhesive extending a predetermined height above the flexure layer. A first standoff 810 is formed on the flexure layer and shaped to limit spread of the adhesive beyond the first portion of the flexure layer, the first standoff extending the predetermined height above the flexure layer. A second standoff (or adhesive limitation) 812 is provided that is formed on a second portion of the flexure layer (separate from the first portion and separate from the adhesive) and positioned to prevent tilting of the slider relative to the flexure layer during mounting of the slider onto the flexure layer, the second standoff also extending the predetermined height above the flexure layer.

Additional Exemplary Method Embodiments

Figure 9:
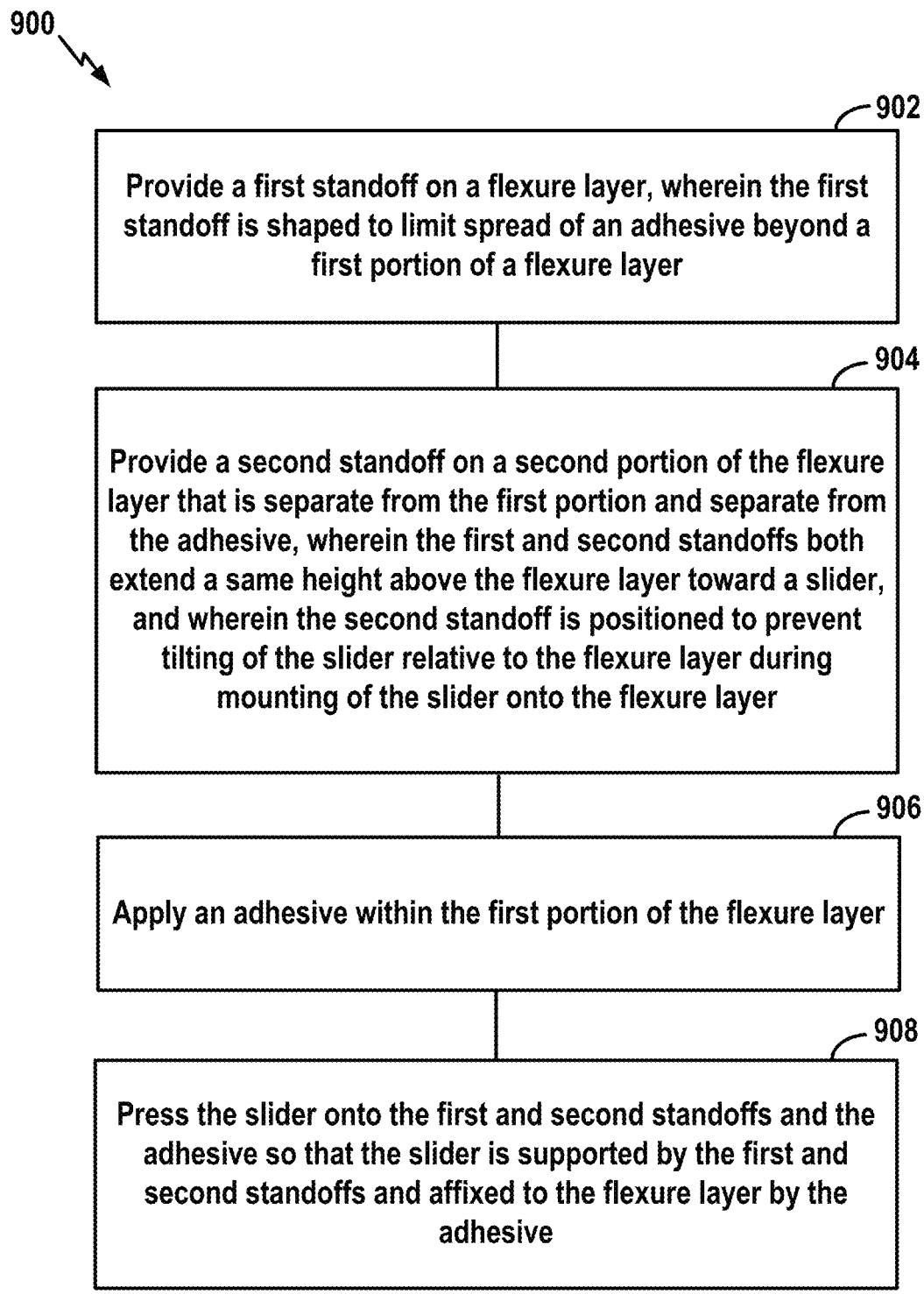
FIG. 9 is a flow chart summarizing an exemplary method for providing or assembling a head assembly.

FIG. 9 illustrates an exemplary flowchart or flow diagram 900 according to an aspect of the disclosure. The method 900 includes, as shown at block 902, providing a first standoff on a flexure layer, wherein the first standoff is shaped to limit spread of an adhesive beyond a first portion of the flexure layer. The method 900 includes, as shown at block 904, providing a second standoff on a second portion of the flexure layer that is separate from the first portion and separate from the adhesive, wherein the first and second standoffs each extend a same height above the flexure layer, and wherein the second standoff is positioned to prevent tilting of a slider relative to the flexure layer during mounting of the slider onto the flexure layer. The method 900 includes, as shown at block 906, applying an adhesive within the first portion of the flexure layer. The method 900 includes, as shown at block 908, pressing the slider onto the first and second standoffs and the adhesive so that the slider is supported by the first and second standoffs and affixed to the flexure layer by the adhesive.

Figure 10:
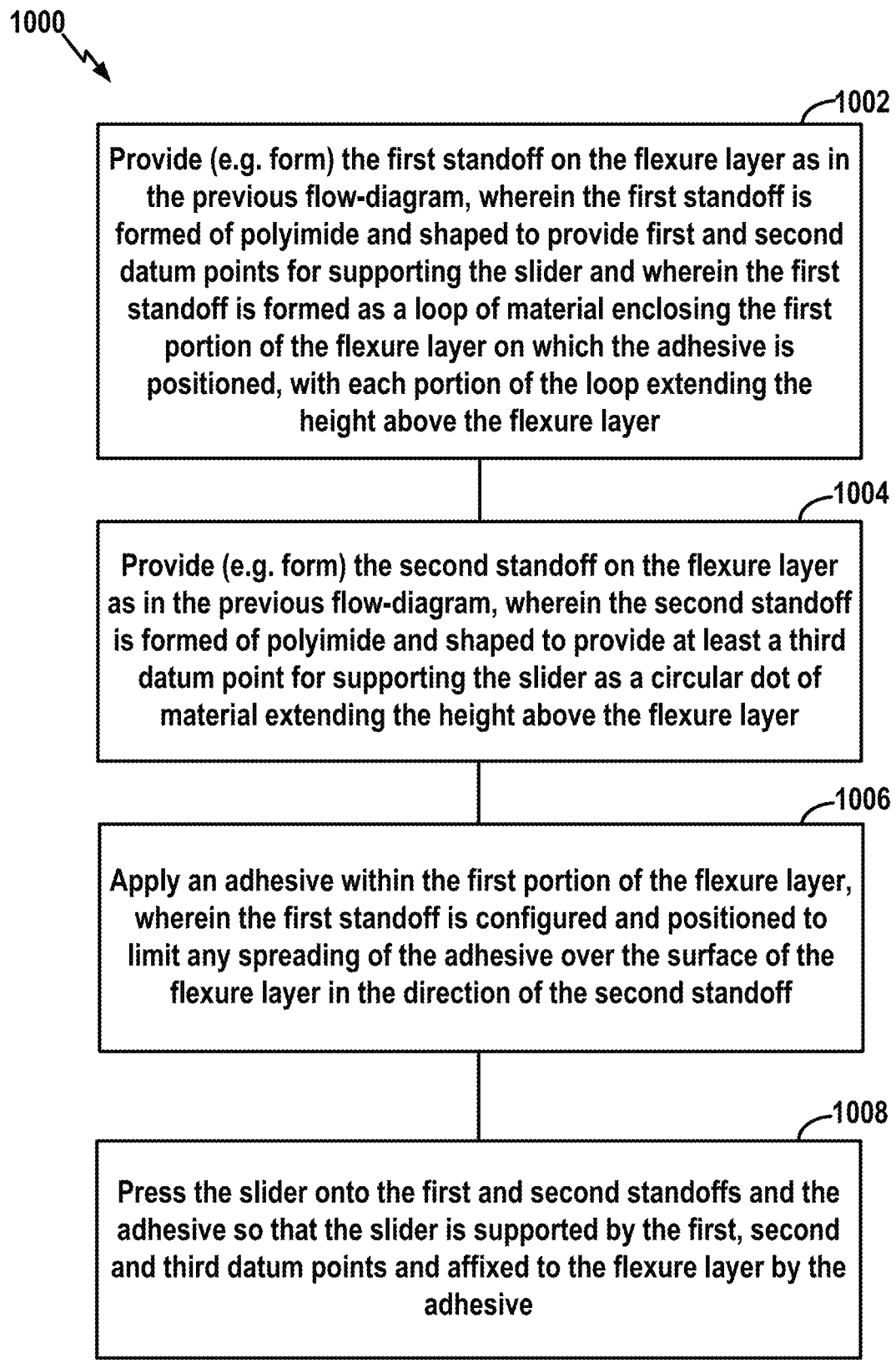
FIG. 10 is a flow chart summarizing additional aspects of an exemplary method for providing or assembling a head assembly.

FIG. 10 illustrates an exemplary flowchart or flow diagram 1000 according to additional aspects of the disclosure. The method 1000 includes, as shown at block 1002, providing (e.g. forming) the first standoff on the flexure layer as in the flow-diagram of FIG. 9, wherein the first standoff is formed of polyimide and shaped to provide first and second datum points for supporting the slider and wherein the first standoff is formed as a loop of material enclosing the first portion of the flexure layer on which the adhesive is positioned, with each portion of the loop extending or protruding or projecting the height above the flexure layer. The method 1000 includes, as shown at block 1004, providing (e.g. forming) the second standoff on the flexure layer as in the flow-diagram of FIG. 9, wherein the second standoff is formed of polyimide and shaped to provide at least a third datum point for supporting the slider as a circular dot of material protruding or extending the height above the flexure layer. The method 1000 includes, as shown at block 1006, applying an adhesive within the first portion of the flexure layer, wherein the first standoff is configured and positioned to limit any spreading of the adhesive over the surface of the flexure layer in the direction of the second standoff. The method 1000 includes, as shown at block 1008, press the slider onto the first and second standoffs and the adhesive so that the slider is supported by the first, second and third datum points and affixed to the flexure layer by the adhesive.

Figure 11:
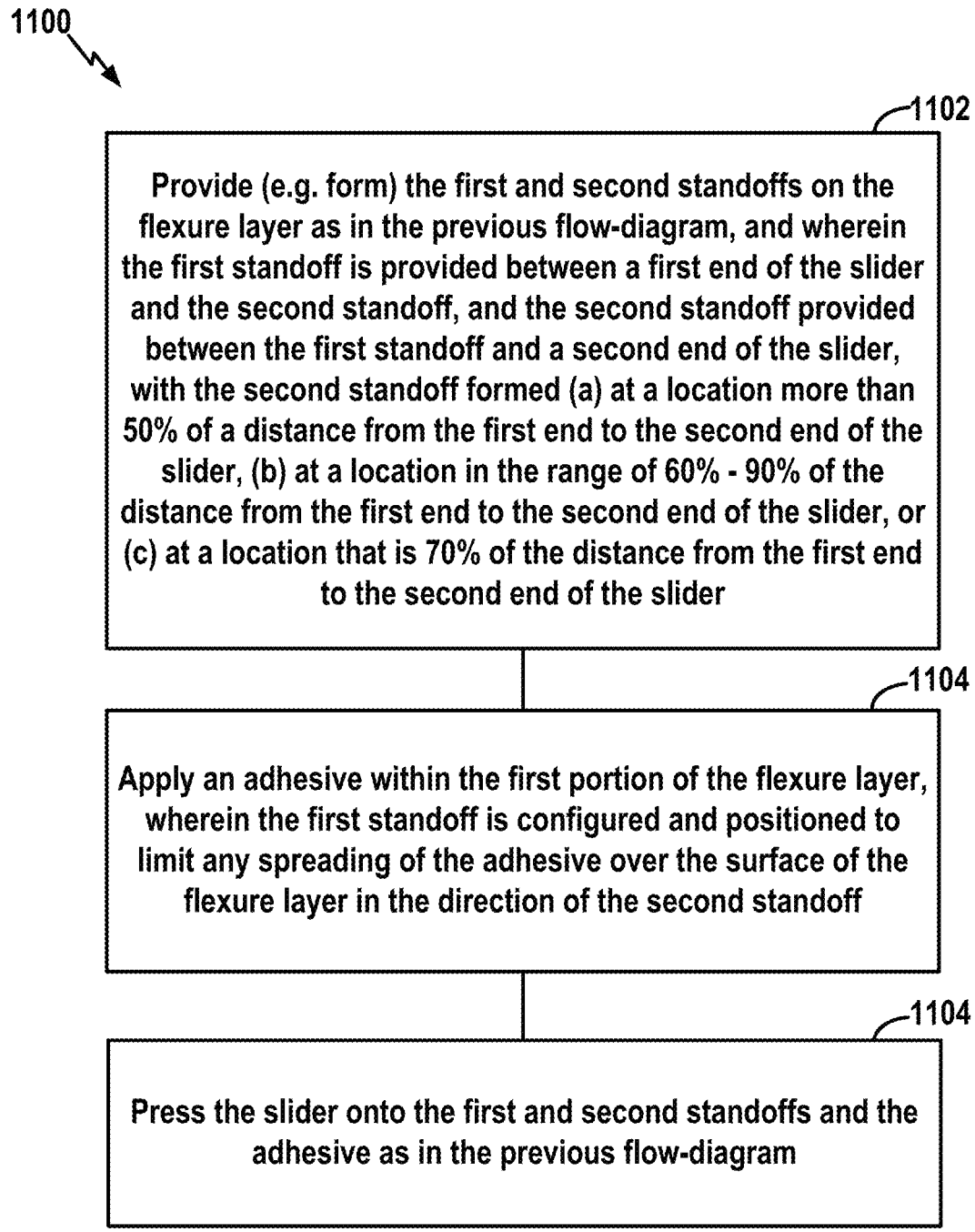
FIG. 11 is a flow chart summarizing still further aspects of an exemplary method for providing or assembling a head assembly.

FIG. 11 illustrates an exemplary flowchart or flow diagram 1100 according to still further aspects of the disclosure. The method 1100 includes, as shown at block 1102, providing (e.g. forming) the first and second standoffs on the flexure layer as in the flow-diagram of FIG. 10, and wherein the first standoff is formed between a first end of the slider and the second standoff, and the second standoff formed between the first standoff and a second end of the slider, with the second standoff formed (a) at a location more than 50% of a distance from the first end to the second end of the slider, (b) at a location in the range of 60%-90% of the distance from the first end to the second end of the slider, or (c) at a location that is 70% of the distance from the first end to the second end of the slider. The method 1100 includes, as shown at block 1104, applying an adhesive within the first portion of the flexure layer, wherein the first standoff is configured and positioned to limit any spreading of the adhesive over the surface of the flexure layer in the direction of the second standoff. The method 1100 includes, as shown at block 1106, pressing the slider onto the first and second standoffs and the adhesive as in the flow-diagram of FIG. 10.

In at least some examples, means may be provided for performing functions illustrated in FIGS. 9-11 and/or other functions illustrated or described herein. For example, the means may include one or more of: means for forming a first standoff on a flexure layer, wherein the first standoff is shaped to limit spread of an adhesive beyond a first portion of the flexure layer; means for forming a second standoff on a second portion of the flexure layer that is separate from the first portion and separate from the adhesive, wherein the first and second standoffs each extend a same height above the flexure layer, and wherein the second standoff is positioned to prevent tilting of a slider relative to the flexure layer during mounting of the slider onto the flexure layer; means for applying an adhesive within the first portion of the flexure layer; and means for pressing the slider onto the first and second standoffs and the adhesive so that the slider is supported by the first and second standoffs and affixed to the flexure layer by the adhesive.

Additional Aspects

While the above description contains many specific embodiments of the disclosure, these should not be construed as limitations on the scope of the claims, but rather as examples of specific embodiments thereof.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events might in some cases be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Aspects of the present disclosure have been described above with reference to schematic flowchart diagrams and/or schematic block diagrams of methods, apparatus, systems, and products according to embodiments of the disclosure. Some blocks might be controlled by computer program instructions, such as those blocks related to manufacture or assembly. These computer program instructions may be provided to a processor of a computer or other programmable data processing apparatus to produce a machine, such that the instructions, which execute via the processor or other programmable data processing apparatus, create means for implementing the functions and/or acts specified in at least some of the blocks.

At least some assembly or manufacturing features described herein might be controlled by hardware, software, firmware, or any combination thereof. At least some features described herein may be controlled by a computer based on a computer readable medium having stored thereon computer executable instructions that when executed by a computer (e.g., a processor) control the computer to perform at least some of the functions described herein. Examples of suitable computer readable media include non-transitory computer-readable media, such as disk memory devices, chip memory devices, programmable logic devices, and application specific integrated circuits.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments, these should not be construed as limitations on the scope of the claims, but rather as examples of specific embodiments thereof. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC) Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

In the foregoing specification, aspects were described with reference to specific exemplary embodiments, but those skilled in the art will recognize that the disclosure is not limited to those. It is contemplated that various features and aspects of the disclosure may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A head assembly for a hard disk drive, comprising:
   a slider;
   a flexure layer including a plurality of bond pads positioned at ends of corresponding electrically conductive traces;
   an adhesive on the flexure layer to affix the slider to a first portion of the flexure layer;
   a first standoff formed on the flexure layer; and
   a second standoff formed on a second portion of the flexure layer that is separate from the first portion and separate from the adhesive, wherein the first and second standoffs both extend a same height above the flexure layer toward the slider, and wherein the second standoff is positioned to prevent tilting of the slider relative to the flexure layer during mounting of the slider onto the flexure layer, and wherein the first standoff is configured and positioned to block spread of the adhesive beyond the first portion of the flexure layer in a direction of the second standoff and in directions toward opposing lateral sides of the flexure layer, the first standoff configured to allow spread of the adhesive in a direction away from the second standoff and toward the plurality of bond pads, wherein the head assembly is configured with no barrier to block adhesive spread toward the plurality of bond pads.

2. The head assembly of claim 1, wherein the first standoff is configured to provide at least first and second datum points for supporting the slider and the second standoff is configured to provide at least a third datum point for supporting the slider.

3. The head assembly of claim 2, wherein the first, second, and third datum points define a plane that is parallel with a flat top surface of the flexure layer for supporting a flat bottom surface of the slider at the height above the flexure layer.

4. The head assembly of claim 1, wherein the first standoff comprises a cross section in the shape of a loop enclosing the first portion of the flexure layer on which the adhesive is positioned, each portion of the first standoff along the loop extending the height above the flexure layer.

5. The head assembly of claim 1, wherein the second standoff is a circular dot of material extending the height above the flexure layer.

6. The head assembly of claim 1, wherein the first standoff extends across the flexure layer between opposing sides of the flexure layer to block any spreading of the adhesive over a surface of the flexure layer in the direction of the second standoff.

7. The head assembly of claim 1, wherein the first and second standoffs comprise polyimide standoffs.

8. The head assembly of claim 1, wherein the slider has first and second ends, the first standoff positioned between the first end of the slider and the second standoff, the second standoff positioned between the first standoff and the second end of the slider, and wherein the second standoff is positioned at a location more than 50% of a distance from the first end of the slider to the second end of the slider.

9. The head assembly of claim 1, wherein the first standoff has a pair of opposing straight lateral side portions, a straight leading portion facing toward the second standoff, and a pair of curved portions connecting the lateral side portions and the straight leading portion, the curved portions configured to bend inwardly into the first portion of the flexure layer.

10. A data storage device, comprising:
a head assembly that includes
a slider,
a flexure layer including a plurality of bond pads positioned at ends of corresponding electrically conductive traces,
an adhesive on the flexure layer to affix the slider to a first portion of the flexure layer,
a first standoff formed on the flexure layer, and
a second standoff formed on a second portion of the flexure layer that is separate from the first portion and separate from the adhesive, wherein the first and second standoffs both extend a same height above the flexure layer toward the slider, and wherein the second standoff is positioned to prevent tilting of the slider relative to the flexure layer during mounting of the slider onto the flexure layer, and wherein the first standoff is configured and positioned to block spread of the adhesive beyond the first portion of the flexure layer in a direction of the second standoff and in directions toward opposing lateral sides of the flexure layer, the first standoff configured to allow spread of the adhesive in a direction away from the second standoff and toward the plurality of bond pads, wherein the head assembly is configured with no barrier to block adhesive spread toward the plurality of bond pads.

11. The data storage device claim 10, wherein the first standoff has a pair of opposing straight lateral side portions, a straight leading portion facing toward the second standoff, and a pair of curved portions connecting the lateral side portions and the straight leading portion, the curved portions configured to bend inwardly into the first portion of the flexure layer.

12. A method for providing a head assembly for a hard disk drive, the method comprising:
providing a first standoff on a flexure layer, the flexure layer including a plurality of bond pads positioned at ends of corresponding electrically conductive traces;
providing a second standoff on a second portion of the flexure layer that is separate from a first portion of the flexure layer and separate from an adhesive on the first portion, wherein the first and second standoffs both extend a same height above the flexure layer toward a slider, wherein the second standoff is positioned to prevent tilting of the slider relative to the flexure layer during mounting of the slider onto the flexure layer, and wherein the first standoff is configured and positioned to block spread of the adhesive beyond the first portion of the flexure layer in a direction of the second standoff and in directions toward opposing lateral sides of the flexure layer, the first standoff configured to allow spread of the adhesive in a direction away from the second standoff and toward the plurality of bond pads, wherein the head assembly has no barrier to block adhesive spread toward the plurality of bond pads;
applying an adhesive within the first portion of the flexure layer; and
pressing the slider onto the first and second standoffs and the adhesive so that the slider is supported by the first and second standoffs and affixed to the flexure layer by the adhesive.

13. The method of claim 12, wherein the first standoff is formed to provide at least first and second datum points for supporting the slider and the second standoff is formed to provide at least a third datum point for supporting the slider.

14. The method of claim 13, wherein the first, second, and third datum points are formed to define a plane that is parallel with a flat top surface of the flexure layer for supporting a flat bottom surface of the slider at the height above the flexure layer.

15. The method of claim 12, wherein the first standoff is formed as a loop of material enclosing the first portion of the flexure layer on which the adhesive is positioned, with each portion of the loop extending the height above the flexure layer.

16. The method of claim 12, wherein the first standoff extends across the flexure layer between opposing sides of the flexure layer to block any spreading of the adhesive over a surface of the flexure layer in the direction of the second standoff.

17. The method of providing a head assembly of claim 12, wherein the first standoff is formed to have a pair of opposing straight lateral side portions, a straight leading portion facing toward the second standoff, and a pair of curved portions connecting the lateral side portions and the straight leading portion, the curved portions configured to bend inwardly into the first portion of the flexure layer.

* * * * *